UNITED STATES PATENT OFFICE.

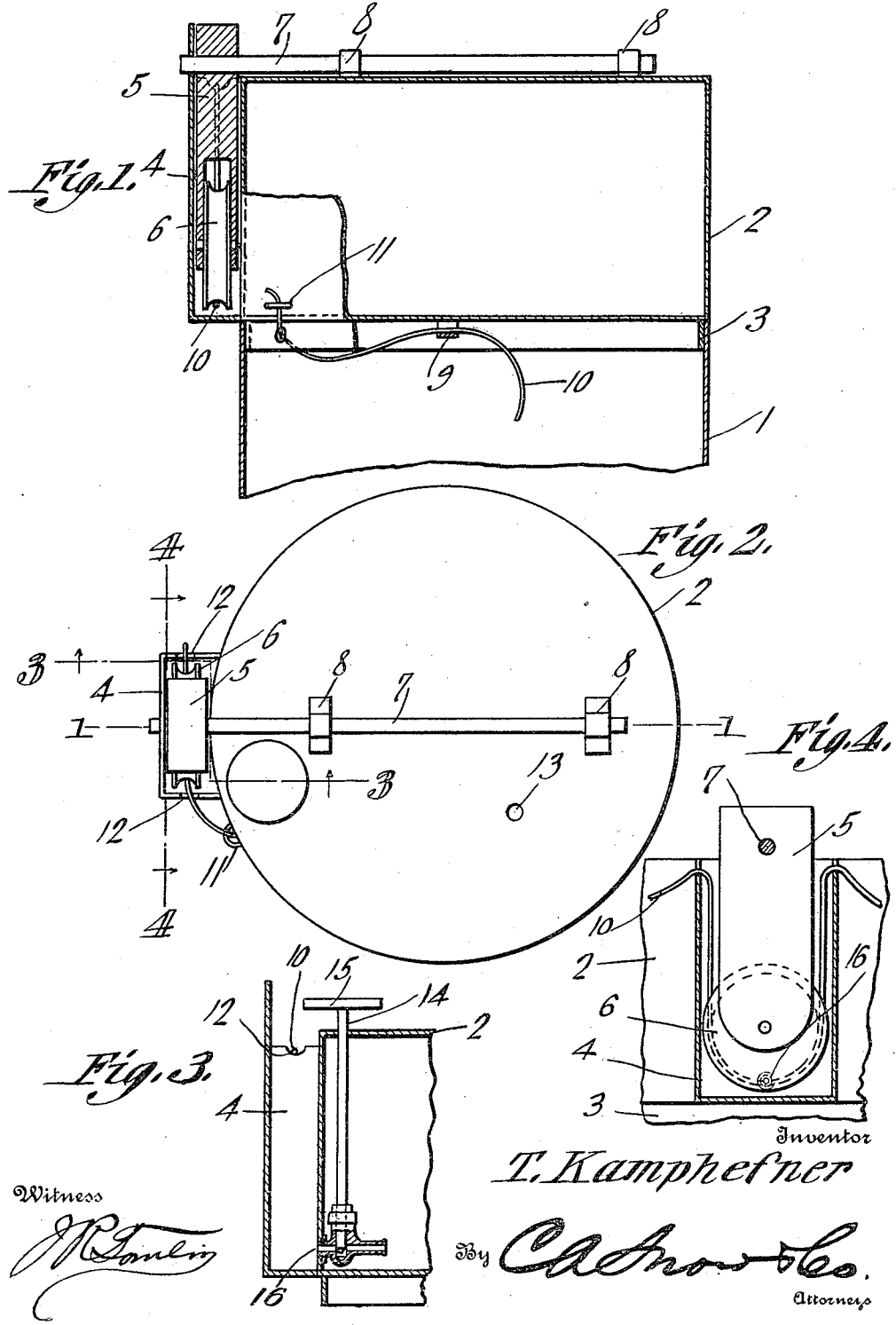

THOMAS KAMPHEFNER, OF WALDRON, MISSOURI.

TWINE-BOX TOP.

1,272,456.  Specification of Letters Patent.  Patented July 16, 1918.

Application filed April 25, 1918. Serial No. 230,734.

*To all whom it may concern:*

Be it known that I, THOMAS KAMPHEFNER, a citizen of the United States, residing at Waldron, in the county of Platte and State of Missouri, have invented a new and useful Twine-Box Top, of which the following is a specification.

The subject of this invention is a twine box top intended for use as a closure for the twine box of a harvester, and the main object of the invention is to provide means for treating the twine, as it is led from the twine box, with a view to rendering the twine impervious to insects so that the twine will not be cut by them and the contents of the bundles scattered, as is now so often the case.

A further object within the contemplation of the invention is the provision of means for holding the liquid with which the twine is to be treated.

The invention also contemplates the provision of means for guiding the twine through the liquid.

It is also within the contemplation of the invention to provide means for controlling the supply of liquid with which the twine is to be treated.

A further object of the invention is to generally improve the construction and enhance the utility of devices of this character.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of the claims without departing from the spirit of the invention.

A practical embodiment of the invention is shown in the accompanying drawing, wherein:—

Figure 1 is a sectional view of the device taken on the line 1—1 of Fig. 2, and showing the same in place on a twine box;

Fig. 2 is a plan view;

Fig. 3 is a detail sectional view taken on the line 3—3 of Fig. 2;

Fig. 4 is a detail sectional view taken on the line 4—4 of Fig. 2.

Referring to the drawing by numerals of reference:—

The usual and ordinary twine box is indicated by the numeral 1 and on this box is seated a tank 2 which has an annular flange secured to and depending from the bottom thereof and adapted to telescope into the mouth of the twine box 1.

Secured to the side of the tank 2 is a cup or chamber 4 which opens upwardly and in which is inserted a member 5 in the forked lower end of which is journaled a grooved roller 6. The outer wall of the cup 4 is extended upwardly above the top of the tank 2, and is apertured to aline with an aperture formed in the member 5 for the purpose of receiving a rod 7 which is passed through said apertures and through eyes or loops 8, which loops are secured on and rise from the top of the tank 2. The purpose of the rod 7 is to bind and retain the member 5 in place within the cup 4.

Formed on the bottom of the tank 2 is a loop 9 through which the twine 10 is led from the ball and the twine passes from this loop through an opening formed in the flange 3 and a guiding eye 11 formed on the tank 2. The twine is then led over one side of the cup 4, the upper edge of the side being provided with a notch 12 for the reception of the twine. The twine passes down under the roller 6 and thence up and over the edge of the opposite side of the cup, from whence it is led to the binding mechanism in the usual way.

A filling or supply hole 13 is provided in the top of the tank 2, and a port 16 in the side of the tank furnishes communication between the tank and the cup 4. A valve having a stem 14 is provided for controlling the passage of liquid between the tank 2 and the cup 4 and the stem 14 projects through an aperture formed in the top of the tank 2 and is supplied, on its projecting end, with a knurled thumb wheel 15 by which the valve may be operated.

As will be apparent, the rod 7 may be withdrawn to permit the member 5 and roller 6 to be removed from the cup so that the twine may be readily placed therein, the roller and member 5 serving to retain the twine immersed in the liquid.

While the cover has been described and shown as having an annular flange 3 which telescopes with the open end of the twine box, it is to be understood that any usual and ordinary means may be resorted to for securing the cover in place upon the box, and that the flange 3 may or may not form a part of the cover.

Having thus described the invention, what is claimed as new and sought by Letters Patent, is:—

1. A twine box cover, including a tank, a cup secured to the tank and in communication therewith, and means for guiding twine through the cup.

2. A twine box cover, including a liquid container, and means for guiding twine through the liquid container.

3. A twine box cover, including a tank, a cup secured to the tank and in communication therewith, means for guiding twine to the cup, and means for guiding twine downwardly within the cup.

4. A twine box cover, including a tank, a cup secured to the tank and in communication therewith, means for guiding twine to the cup, a guiding element insertible in the cup for guiding twine downwardly within the cup, and means for locking said element in place.

5. A twine box, including a tank, a cup secured to the tank and in communication therewith, means for guiding twine through the cup, and means for controlling the communication between the tank and cup.

In testimony that I claim the foregoing as my own, I have hereto affixed my signature in the presence of two witnesses.

THOMAS KAMPHEFNER.

Witnesses:
A. E. FUNKHANEL.
ARTHUR JONES.

Copies of this patent may be obtained for five cents each, by addressing the "Commissioner of Patents, Washington, D. C."